United States Patent
Erhart et al.

(10) Patent No.: US 8,233,028 B2
(45) Date of Patent: Jul. 31, 2012

(54) DYNAMIC VISUAL BACKGROUND FOR CALL-CENTER AGENTS

(75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1364 days.

(21) Appl. No.: 11/828,581

(22) Filed: Jul. 26, 2007

(65) Prior Publication Data

US 2009/0027479 A1   Jan. 29, 2009

(51) Int. Cl.
*H04N 7/14* (2006.01)
(52) U.S. Cl. .................................. 348/14.09; 348/14.08
(58) Field of Classification Search ..... 348/14.01–14.16; 379/201.01, 202.01
See application file for complete search history.

(56) References Cited

U.S. PATENT DOCUMENTS

| 7,227,567 | B1 | 6/2007 | Beck et al. | |
| 2003/0118173 | A1* | 6/2003 | Bluestein et al. | 379/265.02 |
| 2004/0012613 | A1* | 1/2004 | Rast | 348/14.01 |

OTHER PUBLICATIONS

Nash, Michael, "EP Application No. 08013333.3-2414 Extended European Search Report Dec. 1, 2008", , Publisher: EPO, Published in: EP.
"EP Application No. 08013333.3-2414 / 2019550 Office Action Aug. 20, 2009", , Publisher: EPO, Published in: EP.

* cited by examiner

*Primary Examiner* — Brian Ensey

(57) ABSTRACT

A system is disclosed that enables a first call participant, such as an agent at a call center, to project a carefully-controlled appearance towards a second call participant, such as a customer calling for technical support, while on a video call. Using the real-time image of the first call participant while on a video call, as well as additional information, the system of the illustrative embodiment selects and superimposes a visual background that appears to the caller as being behind the agent. The visual background can be selected to cater towards what the caller expects or wants to see, or what the message is that the agent-represented business wants to convey. The system of the illustrative embodiment can dynamically change the visual background during a call or from one call to another, depending on factors related to the calling party, factors related to the called party, and so forth.

21 Claims, 3 Drawing Sheets

DYNAMIC VISUAL BACKGROUND FOR CALL-CENTER AGENTS

FIELD OF THE INVENTION

The present invention relates to telecommunications in general, and, more particularly, to superimposing a visual background in the same image as a video-call participant.

BACKGROUND OF THE INVENTION

A call center is a centralized office used for the purpose of handling a large volume of telephone calls. For example, a call center can be operated by an enterprise to process incoming calls from customers seeking product support or other information, in which the calls are directed to service agents who can then assist the customers. An enterprise can use a call center for outgoing calls as well.

FIG. 1 depicts telecommunications system 100 in the prior art, which features a call center. Telecommunications system 100 comprises telecommunications terminals 101-1 through 101-M, wherein M is a positive integer; telecommunications network 105; private branch exchange (PBX) 110; telecommunications terminals 111-1 through 111-N, wherein N is a positive integer; and interactive voice response (IVR) system 120, the depicted elements being interconnected as shown. The call center itself comprises elements 110, 111-1 through 111-N, and 120.

Calling telecommunications terminal 101-m, where m has a value between 1 and M, is one of a telephone, a notebook computer, a personal digital assistant (PDA), etc. and is capable of placing and receiving calls via telecommunications network 105.

Telecommunications network 105 is a network such as the Public Switched Telephone Network [PSTN], the Internet, etc. that carries calls to and from telecommunications terminal 101, private branch exchange 110, and other devices not appearing in FIG. 1. A call might be a conventional voice telephony call, a video-based call, a text-based instant messaging (IM) session, a Voice over Internet Protocol (VoIP) call, and so forth.

Private branch exchange (PBX) 110 receives incoming calls from telecommunications network 105 and directs the calls to IVR system 120 or to one of a plurality of telecommunications terminals within the enterprise (i.e., enterprise terminals 111-1 through 111-N), depending on how exchange 110 is programmed or configured. For example, in an enterprise call center, exchange 110 might comprise logic for routing calls to service agents' terminals based on criteria such as how busy various service agents have been in a recent time interval, the telephone number called, and so forth.

Additionally, exchange 110 might be programmed or configured so that an incoming call is initially routed to IVR system 120, and, based on caller input to system 120, subsequently redirected back to exchange 110 for routing to an appropriate telecommunications terminal within the enterprise. Possibly, exchange 110 might queue each incoming call if all agents are busy, until the queued call can be routed to an available agent at one of enterprise terminals 111-1 through 111-N. Exchange 110 also receives outbound signals from enterprise terminals 111-1 through 111-N and from IVR system 120, and transmits the signals on to telecommunications network 105 for delivery to a caller's terminal.

Enterprise telecommunications terminal 111-n, where n has a value between 1 and N, is typically a deskset telephone, but can be a notebook computer, a personal digital assistant (PDA), and so forth, and is capable of receiving and placing calls via telecommunications network 105.

Interactive voice response (IVR) system 120 is a data-processing system that presents one or more menus to a caller and receives caller input (e.g., speech signals, keypad input, etc.), as described above, via private branch exchange 110. IVR system 120 is typically programmable and performs its tasks by executing one or more instances of an IVR system application. An IVR system application typically comprises one or more scripts that specify what speech is generated by IVR system 120, what input to collect from the caller, and what actions to take in response to caller input. For example, an IVR system application might comprise a top-level script that presents a main menu to the caller, and additional scripts that correspond to each of the menu options (e.g., a script for reviewing bank account balances, a script for making a transfer of funds between accounts, etc.).

Once the call is passed from the IVR system to the appropriate service agent who will handle the video call, the calling party will see not only the agent, but the agent's surroundings as well. This can be distracting in some situations, such as when i) what the caller expects to see, or wants to see, on the video call and ii) what he actually sees, are different from each other.

SUMMARY OF THE INVENTION

The system of the present invention enables a first call participant, such as an agent at a call center, to project a carefully-controlled appearance towards a second call participant, such as a customer calling for technical support, while on a video call. Using the real-time image of the first call participant while on a video call, as well as additional information, the system of the illustrative embodiment selects and superimposes a visual background that appears to the caller as being behind the agent. The visual background can be selected to cater towards what the caller expects or wants to see, or what the message is that the agent-represented business wants to convey. The system of the illustrative embodiment can dynamically change the visual background during a call or from one call to another, depending on factors related to the calling party, factors related to the called party, and so forth.

In particular, the system of the illustrative embodiment first receives one or more of a dialed number and a calling number for a video call. After the video call is set up between the caller and an agent, the system receives, in the course of the call, i) a first image that comprises at least part of a call agent, such as the agent's face, and ii) a second image that is based on a dialed number. The second image is one that will serve as a visual background to the agent in the first image. The particular visual background that is selected to make up the second image can be based on, while not being limited to, at least one of:

i. the dialed number,
ii. the calling number,
iii. the local time or other environmental condition at the calling party terminal,
iv. some other signal received from the calling party terminal, and
v. the database record of the calling party.

The system then transmits, during the video call, a composite image that comprises the first and second images. In accordance with the illustrative embodiment, a visual background that constitutes the second image is superimposed in relation to the agent that appears in the first image. In other words, the agent appears to be situated in front of the superimposed visual background.

In some embodiments, the system updates the content of the visual background that is part of the composite image during the course of the call. For example, if the visual background contains textual information, such as advertising information, the actual text message can be changed.

In an example of the illustrative embodiment, suppose that the dialed number corresponds to a lawn-care products support helpline. Based on the dialed number, the visual background appearing behind the call-center agent can be a peaceful backyard setting that features a beautifully-manicured lawn. Additionally, the lighting that appears in the lawn-featuring image can adjusted to match the local time of day of the calling party, which can be derived from the calling number and general local-time information. Because the caller judges the agent's appearance on the video call based in part on the caller's own environment, the composite image appearing on the call is in line with the caller's expectations. The system of the illustrative embodiment achieves an acceptable appearance of the video to the caller, even though the agent might in reality be in a very different, local environment (e.g., in Mumbai, etc.) and hours out of phase with the local time of the caller (e.g., in Los Angeles, etc.).

The illustrative embodiment of the present invention comprises: transmitting an image that represents a first call participant of a video call, to a telecommunications endpoint of a second call participant of the video call, the image comprising: i) at least part of the first call participant, and ii) a visual background that is superimposed in relation to the at least part of the first call participant and that is based on a signal that is received from the telecommunications endpoint of the second call participant.

DETAILED DESCRIPTION

The following terms are defined for use in this Specification, including the appended claims:

The term "call," and its inflected forms, is defined as an interactive communication involving one or more telecommunications terminal (e.g., "phone", etc.) users, who are also known as "parties" to the call. A video call is featured in the illustrative embodiment of the present invention, in which the image of at least one of the call parties is transmitted to another call party. As those who are skilled in the art will appreciate, in some alternative embodiments, a call might be a traditional voice telephone call, an instant messaging (IM) session, and so forth. Furthermore, a call can involve one or more human call parties or one or more automated devices, alone or in combination with each other.

The term "image," and its reflected forms, is defined as a reproduction of the likeness of some subject, such as a person or object. An image can be that of a still subject or moving subject, and the image itself can be fixed or changing over time. When it is received or transmitted, such as in a computer file or in a video stream, the image is represented by a signal. The creation of the signal can involve analog signal processing, as is the case with standard television or other analog video systems, or digital signal processing, as is the case with high-definition television or other video systems that feature digital compression of images.

Figure 1:
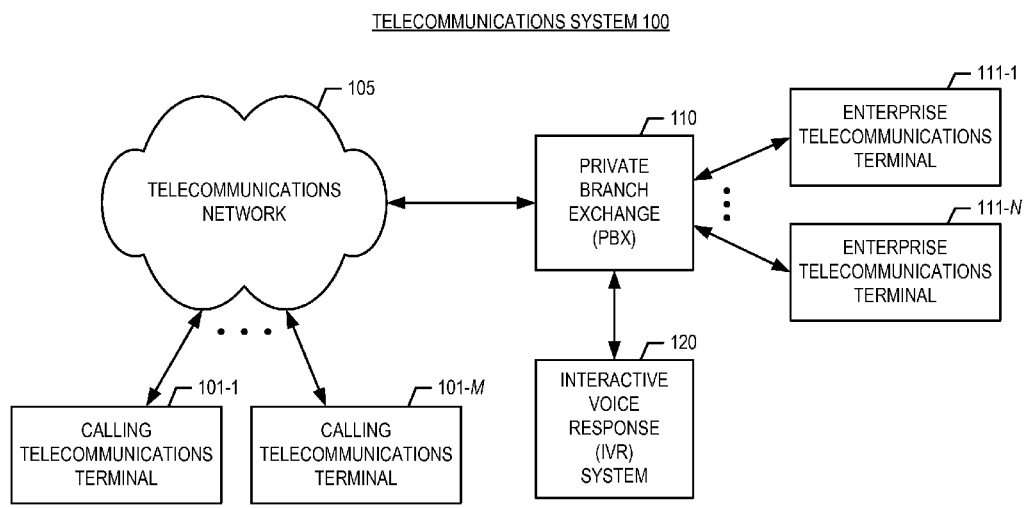
FIG. 1 depicts telecommunications system 100 in the prior art.
Figure 2:
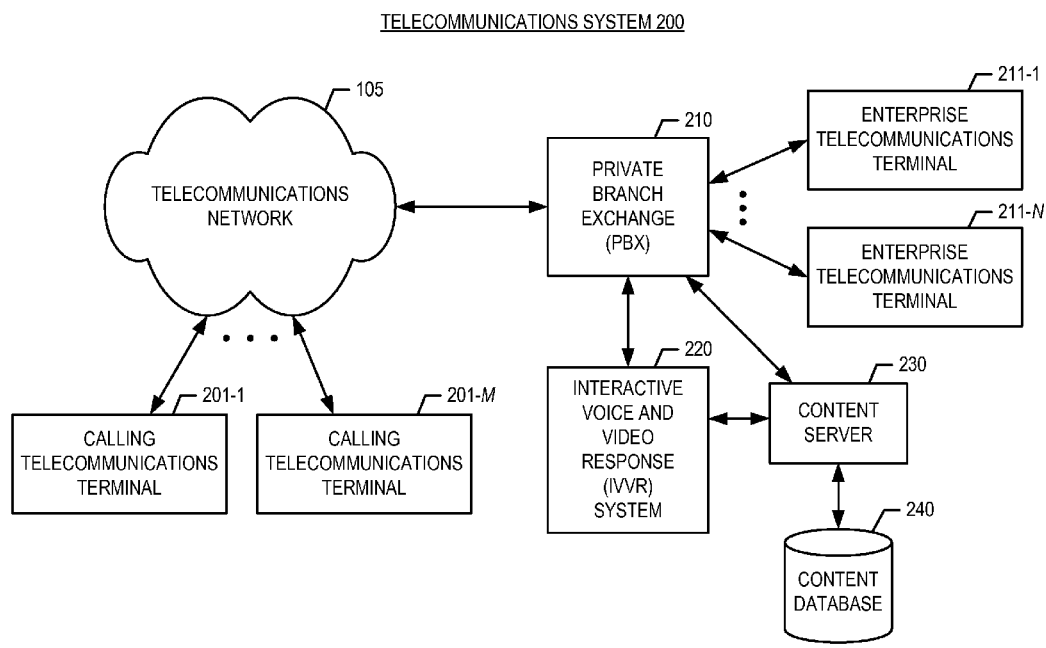
FIG. 2 depicts telecommunications system 200, in accordance with the illustrative embodiment of the present invention.

FIG. 2 depicts telecommunications system 200, which features a call center, in accordance with the illustrative embodiment of the present invention. Telecommunications system 200 comprises calling telecommunications terminals 201-1 through 201-M, wherein M is a positive integer; telecommunications network 105; private branch exchange (PBX) 210; enterprise telecommunications terminals 211-1 through 211-N, wherein N is a positive integer; interactive voice and video response system 220; content server 230; and content database 240, the depicted elements being interconnected as shown. The call center itself comprises elements 210, 211-1 through 211-N, 220, 230, and 240.

Calling telecommunications terminal 201-$m$, where m has a value between 1 and M, is a device that is capable of originating or receiving calls, or both. For example, terminal 201-$m$ can be one of a telephone, a notebook computer, a personal digital assistant (PDA), and so forth. Terminals 201-1 through 201-M can be different from one another, such that terminal 201-1 can be a desk set, terminal 201-2 can be a cell phone, terminal 201-3 can be a softphone on a notebook computer, and so forth.

Terminal 201-$m$ handles calls via telecommunications network 105 and is capable of exchanging video, voice, and call processing-related signals with one or more other devices, such as terminal 211-$n$ through private branch exchange 210. To this end, terminal 201-$m$ exchanges one or more of Internet Protocol (IP) data packets, Session Initiation Protocol (SIP) messages, Voice over IP (VoIP) traffic, and stream-related messages (e.g., Real Time Streaming Protocol [RTSP] messages, etc.) with private branch exchange 210.

In order to handle video signals with its user, terminal 201-$m$ comprises a video camera and display, in addition to comprising other interfaces with its user such as a microphone, speaker, and keypad or keyboard. It will be clear to those skilled in the art how to make and use terminal 201-$m$.

Private branch exchange (PBX) 210 is a data-processing system that provides all of the functionality of private branch exchange 110 of the prior art. In addition to handling conventional telephony-based signals, exchange 210 is also capable of exchanging Internet Protocol (IP) data packets, Session Initiation Protocol (SIP) messages, Voice over IP (VoIP) traffic, and stream-related messages (e.g., Real Time Streaming Protocol [RTSP] messages, etc.) with terminals 201-1 through 201-M and terminals 211-1 through 211-N.

Exchange 210 is further capable of communicating with interactive voice and video response system 220. Exchange 210 and system 220 can coordinate media signal transmissions on a call-by-call basis, or exchange 210 can feed system 220 the media signals from some or all of the calling parties. In accordance with the illustrative embodiment, for a given call, exchange 210 transmits to system 220 the image signal of the call agent of terminal 211-$n$ for the purpose of combining that image signal with another image signal such as from content server 230. Exchange 210 also receives the combined image signal from system 220 and forwards that signal to terminal 201-$m$, the terminal of the user speaking with the call agent.

In some embodiments, exchange 210 is also capable of receiving streamed content (e.g., news clips, movie trailers, filler advertisements, music videos, audiocasts, user instructions, etc.) of one or more media types (e.g., video, audio, multimedia, etc.) from content server 230, of forwarding streamed content on to telecommunications network 105 for delivery to a caller's terminal, and of transmitting signals related to streamed content to content server 230. It will be clear to those skilled in the art, after reading this specification, how to make and use exchange 210.

Enterprise telecommunications terminal 211-*n*, where n has a value between 1 and N, is a device that is capable of originating or receiving calls, or both. In accordance with the illustrative embodiment, terminal 211-*n* is a workstation softphone at a call center; in some alternative embodiments, however, terminal 211-*n* can be one of a telephone, a notebook computer, a personal digital assistant (PDA), and so forth. As those who are skilled in the art will appreciated, terminals 211-1 through 211-N can be different from one another.

Terminal 211-*n* handles calls via exchange 210 and is capable of exchanging video, voice, and call processing-related signals with one or more other devices, such as terminal 201-*m* through network 105. To this end, terminal 211-*n* exchanges one or more of Internet Protocol (IP) data packets, Session Initiation Protocol (SIP) messages, Voice over IP (VoIP) traffic, and stream-related messages (e.g., Real Time Streaming Protocol [RTSP] messages, etc.) with private branch exchange 210.

In order to handle video signals with its user, terminal 211-*n* comprises a video camera and display, in addition to comprising other interfaces with its user such as a microphone, speaker, and keypad or keyboard. It will be clear to those skilled in the art how to make and use terminal 211-*n*.

Interactive voice and video response (IVVR) system 220 is a data-processing system that provides all the functionality of interactive voice response system 120 of the prior art. In addition, system 220 is capable of transmitting commands to content server 230 (e.g., starting playback of a media stream, stopping playback of a media stream, queuing another media stream, etc.), of receiving information from content server 230 (e.g., an indication that playback of a media stream has begun, an indication that playback of a media stream has completed, etc.), and of receiving status information regarding the delivery of media streams to terminal 201-*m*.

System 220 is further capable of performing the tasks of FIG. 3, described below. In performing those tasks for a given call, system 220 receives an image signal of a call agent from exchange 210, combines that image signal with another image signal from content server 230, such as a visual background image, and transmits the composite signal to exchange 210 to send to the corresponding user at terminal 201-*m*. It will be clear to those skilled in the art, after reading this specification, how to make and use system 220.

Content server 230 is a data-processing system that is capable of retrieving content from content database 240, of buffering and delivering a media stream to a calling terminal via exchange 210, of receiving commands from system 220 (e.g., to start playback of a media stream, to queue another media stream, etc.), of transmitting status information to system 220, and of generating content (e.g., dynamically generating a video of rendered text, summarizing or abbreviating the content of a media stream, etc.) in well-known fashion. It will be clear to those skilled in the art, after reading this specification, how to make and use content server 230.

Content database 240 is capable of storing a plurality of multimedia content (e.g., video content, audio content, etc.) and of retrieving content in response to commands from content server 230, in well-known fashion. In some embodiments, database 240 stores a summarized or abbreviated version of at least some of the multimedia content already being stored. It will be clear to those skilled in the art, after reading this specification, how to make and use content database 240.

As will be appreciated by those skilled in the art, some embodiments of the present invention might employ an architecture for telecommunications system 200 that is different than that of the illustrative embodiment. For example, in some embodiments, interactive voice response system 220 and content server 230 might reside on a common server. In some other embodiments, content server 230 and content database 240 might not even be present. It will be clear to those skilled in the art, after reading this specification, how to make and use such alternative architectures.

Figure 3:
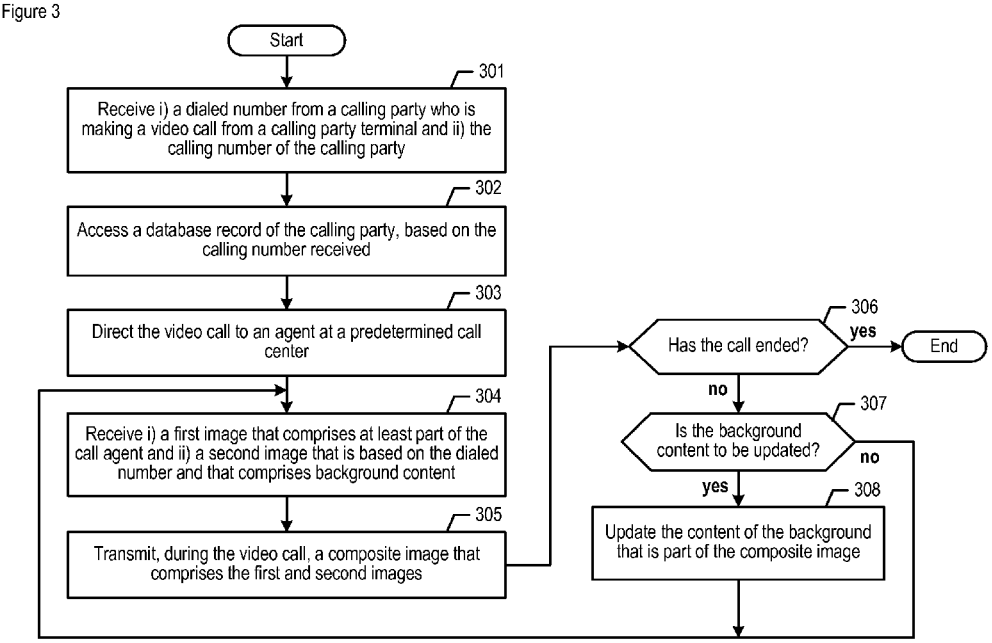
FIG. 3 depicts a flowchart of the salient tasks of interactive voice response (IVR) system 220 in telecommunications system 200.

FIG. 3 depicts a flowchart of the salient tasks of interactive voice and video response (IVVR) system 220, in accordance with the illustrative embodiment of the present invention. As those who are skilled in the art will appreciate, at least some of the tasks depicted in FIG. 3 can be performed simultaneously or in a different order than that depicted. In accordance with the illustrative embodiment, IVVR system 220 executes the depicted tasks, which are described below. However, it will be clear to those skilled in the art, after reading this specification, how to make and use alternative embodiments of the present invention, in which a data-processing system other than system 220, such as PBX 210, executes some or all of the described tasks.

For pedagogical purposes, system 220—as well as exchange 210, server 230, and database 240—support a call center, at which human service agents who are stationed at terminals 211-1 through 211-N interact with calling parties who use terminals 201-1 through 201-M to make video calls. However, it will be clear to those skilled in the art, after reading this specification, how to make and use alternative embodiments of the present invention, in which some or all of telecommunications system 200 is used to support communication other than that associated with a call center's operations or to support communication other than video calls, or both. Although an example for a single call is described, it will be clear to those skilled in the art how to concurrently process multiple calls by using the described tasks on each call.

The first portion of the tasks described below concerns the processing of an incoming call to a call center. The second portion of the tasks described below concerns the interval of time after a first call participant, who in the example is a customer support agent, has become available to handle a video call involving a second call participant, who in the example is a customer who has called into the call center. The call center itself might be capable of handling calls on behalf of a variety of business clients and, in fact, each agent might handle calls for more than one purpose. For instance, the call center might handle accounts for ten different business clients, ranging from consumer electronics to banking services to lawn-care products, and a particular agent working at the call center might handle two of the accounts, such as product support for the consumer electronics and the lawn-care products accounts. The call center itself can be situated anywhere in the world; for pedagogical purposes, in the illustrative example it is situated in Mumbai, India.

At task 301, IVR system 220 receives i) a dialed number from a calling party who is making a video call from terminal 201-1 and ii) the calling number of the calling party. For example, the calling party might be calling the dialed number that corresponds to lawn-care products. In accordance with the illustrative embodiment, the dialed number refers to the called number as dialed by the calling party; however, in some alternative embodiments, the dialed number refers to a keypad option dialed by the calling party during an interactive voice and video response session. In the illustrative example, the received calling number indicates that the caller is calling from Los Angeles, United States.

At task 302, system 220 accesses a database record of the calling party, based on the calling number received. The database record contains at least one of i) a color preference of the calling party, ii) a call history of the calling party, iii) a purchasing history of the calling party. For example, if the calling party has purchased lawn-care products before, the record contains information about the past purchases.

At task 303, system 220 directs the video call to an agent at the call center served by the IVR system, based on the dialed number (i.e., the called number or a keypad option selected during an IVVR session). In the illustrative example, the call is directed to an agent who is knowledgeable in lawn-care products.

At task 304, system 220 receives i) a first image that comprises at least part of the call agent, such as the agent's face, and ii) a second image that is based on the dialed number. Note that the received images are represented as signals, where each image can be received in the form of a video stream (as in the illustrative embodiment), computer file, or other suitable form. In accordance with the illustrative embodiment, the second image is one that will serve as a visual background to the agent in the first image. The particular visual background that is selected to make up the second image can be based on, while not being limited to, at least one of:
 i. the dialed number,
 ii. the calling number,
 iii. the local time or other environmental condition at calling party terminal 201-1,
 iv. some other signal received from calling party terminal 201-1, and
 v. the database record of the calling party.

As a first example, because the dialed number corresponds to lawn-care products support, the visual background to be used can be a peaceful backyard setting that features a beautifully-manicured lawn. As a second example, the same backyard scene appears, but with lighting that is adjusted to match the local time of day of the calling party, even though the featured lighting might be hours out of phase with the local time at the call center.

System 220 is able to receive and process different combinations of still and moving images. Specifically, the various combinations can include, but are not limited to:
 i. a still first image and a still second image;
 ii. a still first image and a moving second image;
 iii. a moving first image and a moving second image; and
 iv. a moving first image and a still second image.

Additionally, in some embodiments system 220 is able to receive and process more than two image sources for one call.

In some embodiments, the visual background contains textual information that the calling party is able to read. For example, it might contain advertisements for products that the calling party might be interested in, based on the past purchases of the party.

Although a lawn-care oriented, scenic background is featured in the illustrative example, the next call that is handled by the same agent—or by another agent, for that matter-might feature an entirely different visual background, such as a logo-centric background or another background that appears to be decorated on the wall behind the agent.

At task 305, system 220 generates and transmits, during the video call, a composite image that comprises the first and second images. Note that the composite image that is transmitted is represented as a signal (e.g., analog, digital, compressed, encrypted, error-coded, etc.), where the composite image can be transmitted in the form of a video stream (as in the illustrative embodiment), computer file, or other suitable form. In accordance with the illustrative embodiment, a visual background that constitutes the second image is superimposed in relation to the agent that appears in the first image. In other words, the agent appears to be situated in front of the superimposed visual background. As described earlier, the composite image may comprise various combinations of still and moving received images, as well as different numbers of received images than in the present example.

As those are skilled in the art will appreciate, well-known techniques exist for the purpose of superimposing a visual background in relation to a person or object in the foreground. For example, a "green screen" or "blue screen" system can be used. The available techniques enable either a still image or motion video to be superimposed as the background.

At task 306, system 220 checks if the video call has ended. If the call has ended, task execution ends. If the call is still in progress, task execution proceeds to task 307.

At task 307, system 220 checks if the content of the visual background is to be updated. If the content is to be updated, task execution proceeds to task 308. If not, task execution proceeds back to task 304.

At task 308, system 220 updates the content of the visual background that is part of the composite image. For example, if the visual background contains textual information, such as advertising information, the actual text message can be changed. The particular visual background content that is updated can be based on, while not being limited to, at least one of:
 i. the local time or other environmental condition at calling party terminal 201-1,
 ii. some other signal received from calling party terminal 201-1,
 iii. the database record of the calling party,
 iv. the elapsed time of the video call, and
 v. the subject matter being discussed.

After task 308, task execution proceeds back to task 304, in order to continue the processing of the video call.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
 transmitting an image that represents a first call participant of a video call, to a telecommunications endpoint of a second call participant of the video call, the image comprising:
  i) at least part of the first call participant, and
  ii) a visual background that is superimposed in relation to the at least part of the first call participant and that is based on a signal that is received from the telecommunications endpoint of the second call participant.

2. The method of claim 1 wherein the signal represents a dialed number of the video call.

3. The method of claim 1 wherein the signal represents a calling number of the video call.

4. The method of claim 1 wherein the signal represents the local time at the location of the second call participant.

5. The method of claim 1 wherein the first call participant is an agent at a call center and the second call participant is a caller whose video call gets routed to the call center.

6. The method of claim 1 further comprising updating, during the video call, the content of the visual background.

7. The method of claim 6 wherein the updating is based on the elapsed time of the video call.

8. A method comprising:
    receiving, at a data-processing system:
        i) a first image that comprises at least part of a first call participant of a video call,
        ii) a second image that is based on a dialed number, and
        iii) the dialed number from a second call participant of the video call; and
    transmitting, from the data-processing system to a telecommunications endpoint of the second call participant, a composite image that comprises said first image and said second image.

9. The method of claim 8 wherein the second image is also based on the calling number.

10. The method of claim 8 further comprising receiving, at the data-processing system, the local time at the location of the second call participant.

11. The method of claim 8 wherein the first call participant is an agent at a call center and second call participant is a caller whose video call gets routed to the call center.

12. The method of claim 8 further comprising updating, during the video call, the content of the second image.

13. The method of claim 12 wherein the updating is based on the elapsed time of the video call.

14. The method of claim 8 wherein the second image is a superimposed visual background in relation to the first image.

15. A method comprising:
    receiving, at a call center, a calling number of a call participant of a video call;
    accessing a database record of the call participant, based on the calling number;
    directing the video call to an agent at the call center; and
    transmitting, during the video call, an image that represents the agent, to a telecommunications endpoint of the call participant, the image comprising:
        i) at least part of the agent, and
        ii) a visual background that is superimposed in relation to the at least part of the agent and that is based on the database record.

16. The method of claim 15 wherein the database record contains a color preference of the call participant.

17. The method of claim 15 wherein the database record contains a call history of the call participant.

18. The method of claim 15 wherein the database record contains a purchasing history of the call participant.

19. The method of claim 15 wherein the visual background contains textual information.

20. The method of claim 19 further comprising updating the textual information during the video call.

21. The method of claim 15 wherein the superimposed visual background is also based on dialed number.

* * * * *